US009326637B2

(12) United States Patent
Tonelli et al.

(10) Patent No.: US 9,326,637 B2
(45) Date of Patent: May 3, 2016

(54) MILK EMULSIFYING CONTAINER FOR A COFFEE MACHINE AND MACHINE COMPRISING SAID CONTAINER

(75) Inventors: Stefano Tonelli, Gaggio Montano (IT); Cristiano Castelli, Porretta Terme (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 600 days.

(21) Appl. No.: 13/508,764

(22) PCT Filed: Nov. 10, 2010

(86) PCT No.: PCT/IB2010/055107
§ 371 (c)(1),
(2), (4) Date: May 9, 2012

(87) PCT Pub. No.: WO2011/064687
PCT Pub. Date: Jun. 3, 2011

(65) Prior Publication Data
US 2012/0222561 A1    Sep. 6, 2012

(30) Foreign Application Priority Data
Nov. 25, 2009    (IT) ................. FI2009A0249

(51) Int. Cl.
*A47J 31/44* (2006.01)
(52) U.S. Cl.
CPC .................. *A47J 31/4485* (2013.01)
(58) Field of Classification Search
CPC .................................................. A47J 31/4485
USPC ........ 99/293, 452, 284, 286, 288, 290, 323.1, 99/275
See application file for complete search history.

(56) References Cited

U.S. PATENT DOCUMENTS

| 1,549,091 | A | * | 8/1925 | Kelly .............................. 99/294 |
| 2,268,633 | A | * | 1/1942 | Aske ............................... 99/281 |
| 2,550,902 | A | * | 5/1951 | Beckelman ..................... 99/317 |
| 3,132,580 | A | * | 5/1964 | Walker ............................ 99/282 |
| 4,205,598 | A | * | 6/1980 | Leuschner et al. .............. 99/307 |
| RE32,179 | E | * | 6/1986 | Sedam ................ B67D 1/0021 261/121.1 |
| 4,620,953 | A | * | 11/1986 | Silla et al. ...................... 261/142 |
| 5,190,787 | A | * | 3/1993 | Takeoka et al. ............... 426/634 |
| 5,207,148 | A | * | 5/1993 | Anderson et al. ............... 99/281 |
| 5,265,520 | A | * | 11/1993 | Giuliano ...................... 99/323.1 |
| 5,473,972 | A | * | 12/1995 | Rizzuto et al. .................. 99/290 |
| 5,490,447 | A | * | 2/1996 | Giuliano ............. A47J 31/3614 99/286 |
| 5,498,757 | A | * | 3/1996 | Johnson ............... A23C 9/1524 261/152 |
| 5,570,623 | A | * | 11/1996 | Lin ................................. 99/285 |
| 5,628,239 | A | * | 5/1997 | Wu ................................ 99/290 |
| 6,192,785 | B1 | * | 2/2001 | Trida ...................... A47J 31/41 99/275 |
| 6,711,987 | B2 | | 3/2004 | Yoakim et al. |
| 2003/0010215 | A1 | * | 1/2003 | Burkholder ..................... 99/285 |
| 2005/0193890 | A1 | * | 9/2005 | Fukushima ........... A47J 31/401 99/275 |
| 2007/0031558 | A1 | * | 2/2007 | Lussi ............................. 426/520 |
| 2007/0243305 | A1 | * | 10/2007 | Marconi ....................... 426/596 |

FOREIGN PATENT DOCUMENTS

| CN | 2437266 Y | 7/2001 |
| CN | 201260603 Y | 6/2009 |

(Continued)

*Primary Examiner* — Dana Ross
*Assistant Examiner* — Ket D Dang

(57) ABSTRACT

A container includes an emulsifying device having a milk suction pipe, a nozzle for supplying hot or emulsified milk with a discharge end outside the container, a steam inlet and an air inlet. The container is thermally insulated so as to better preserve the milk.

18 Claims, 4 Drawing Sheets

(56) References Cited

FOREIGN PATENT DOCUMENTS

| DE | 102007040307 A1 | 2/2009 |
|----|-----------------|--------|
| WO | 2005013781 A1 | 2/2005 |
| WO | 2005102126 A2 | 11/2005 |
| WO | 2008077264 A1 | 7/2008 |

* cited by examiner

MILK EMULSIFYING CONTAINER FOR A COFFEE MACHINE AND MACHINE COMPRISING SAID CONTAINER

TECHNICAL BACKGROUND

The present invention relates to improvements to accessories for automatic or semiautomatic coffee machines, in particular but not exclusively, for domestic use, and also to coffee machines that utilise said accessories.

PRIOR ART

Various types of automatic or semiautomatic coffee machines for domestic and also professional use have been developed that make it possible to produce coffee- and milk-based beverages. These machines typically comprise a body, inside which there is housed a brewing module fed with ground coffee or else coffee packaged in capsules, pods or other single-dose packagings, as well as with hot water provided by a boiler fed by a tank and a pump. In some cases a system for supplying hot or emulsified milk is connected to the coffee brewing module in order to produce milk- and coffee-based beverages, such as caffè lattes, latte macchiatos, cappuccinos or the like.

In some machines of this type the milk is stored in a tank that may be removed from the machine and stored in a fridge. These containers are equipped with an emulsifying module, that is to say a module that sucks up the milk from the container and heats it, emulsifying it with air, if required, so as to form milk froth. In these machines it is possible to check whether the milk contained in the container has spoiled as a result of not being stored correctly, i.e. if the container has been left out of the fridge for too long.

Machines have also been produced in which the milk container is housed in an external fridge unit coupled to the coffee machine. These fridge units are expensive and bulky.

SUMMARY OF THE INVENTION

The object of the present invention is to create a milk container of the type described above, which utilises an emulsifying module that makes it possible to overcome or reduce all or some of the drawbacks of known devices and containers.

Substantially in accordance with a second aspect, the invention relates to a milk container comprising an emulsifying device having a milk suction pipe, a nozzle for supplying hot or emulsified milk with a discharge end outside the container, a steam inlet and an air inlet, characterised in that it is thermally insulated. The milk is thus kept at a low temperature for longer, even when the container or pitcher is connected to the coffee machine without a fridge unit being provided for housing the container and connected to the coffee machine.

In accordance with some preferred embodiments of the invention, the container comprises a thermometer for measuring the temperature of the milk contained in said container. The user can thus keep the temperature of the milk under control and put the container back in the fridge, removing it from the machine when the milk is no longer cold enough, that is to say when a temperature that could cause the milk to turn bad is reached. The term 'thermometer' means any device able to provide at least one piece of information correlated with the temperature of the milk. In some embodiments it could also be a device that provides merely a single piece of information able to indicate whether the temperature is above or below a threshold value.

In some embodiments the emulsifier is carried by a closure cover of the container. The thermometer is preferably carried by the cover providing a simple and ergonomic construction. Providing the thermometer on the cover yields a number of advantages, including easier construction of the thermally insulated part of the container.

In some embodiments of the invention the milk supply nozzle is mobile between at least two positions, respectively a milk supply position and a washing position. If the container is provided with a handle, this may form a washing channel for the discharge of hot water or condensate that passes through the milk supply nozzle during the washing phases.

According to another aspect the invention relates to a coffee machine comprising a coffee supply module, a steam supply nozzle and a container as described above that can be connected to said steam supply nozzle.

BRIEF DESCRIPTION OF THE DRAWINGS

The invention will be better understood on reading the following description, given with reference to the set of drawings illustrating a non-limiting practical embodiment of the invention and, in particular, in which.

DETAILED DESCRIPTION OF AN EMBODIMENT OF THE INVENTION

Figure 1:
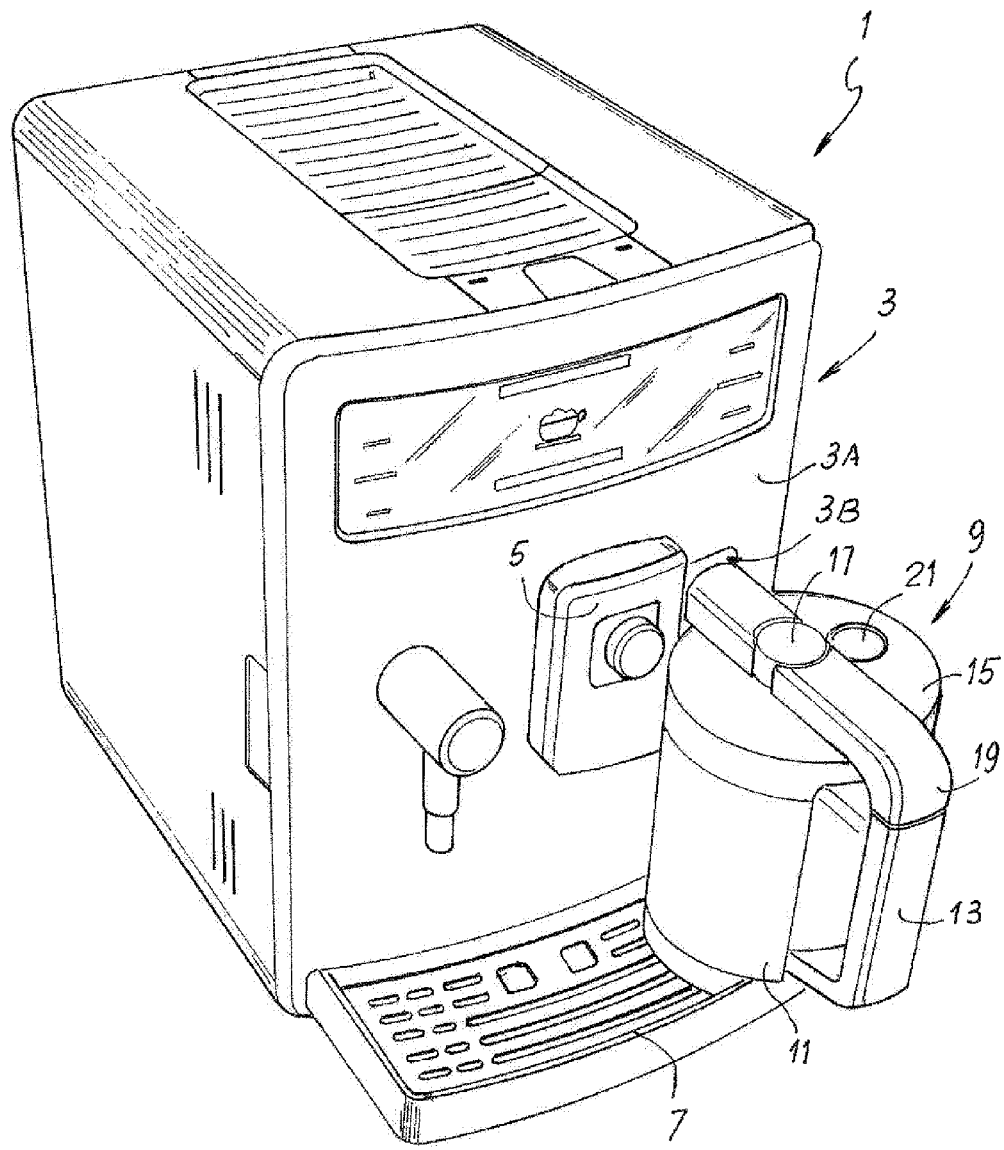
FIG. 1 is a prospective view of a coffee machine equipped with a container according to the invention.

Referring to FIG. 1, reference numeral 1 denotes a coffee machine as a whole, which has a body 3, on the front face or door 3A thereof a coffee supply module is arranged and is indicated schematically by reference numeral 5. The coffee supply module 5 may, for example, have one or two coffee supply nozzles.

A support surface 7 for the mugs, cups or other recipients in which the coffee supplied from the machine 1 is collected are arranged beneath the supply module 5. The surface 7 also serves as a support for a container or pitcher 9 for the milk that can be connected to a steam supply nozzle 35 connected to the machine 1 and illustrated schematically in the sectional view of FIG. 2, where it can also be seen how said steam supply nozzle 35 interacts with the container 9 and how said container is configured to emulsify or heat the milk contained therein and supply it to the mug. The steam supply nozzle 35 may advantageously be housed inside a recess 3B formed in the door 3A of the machine 1.

Figure 2:
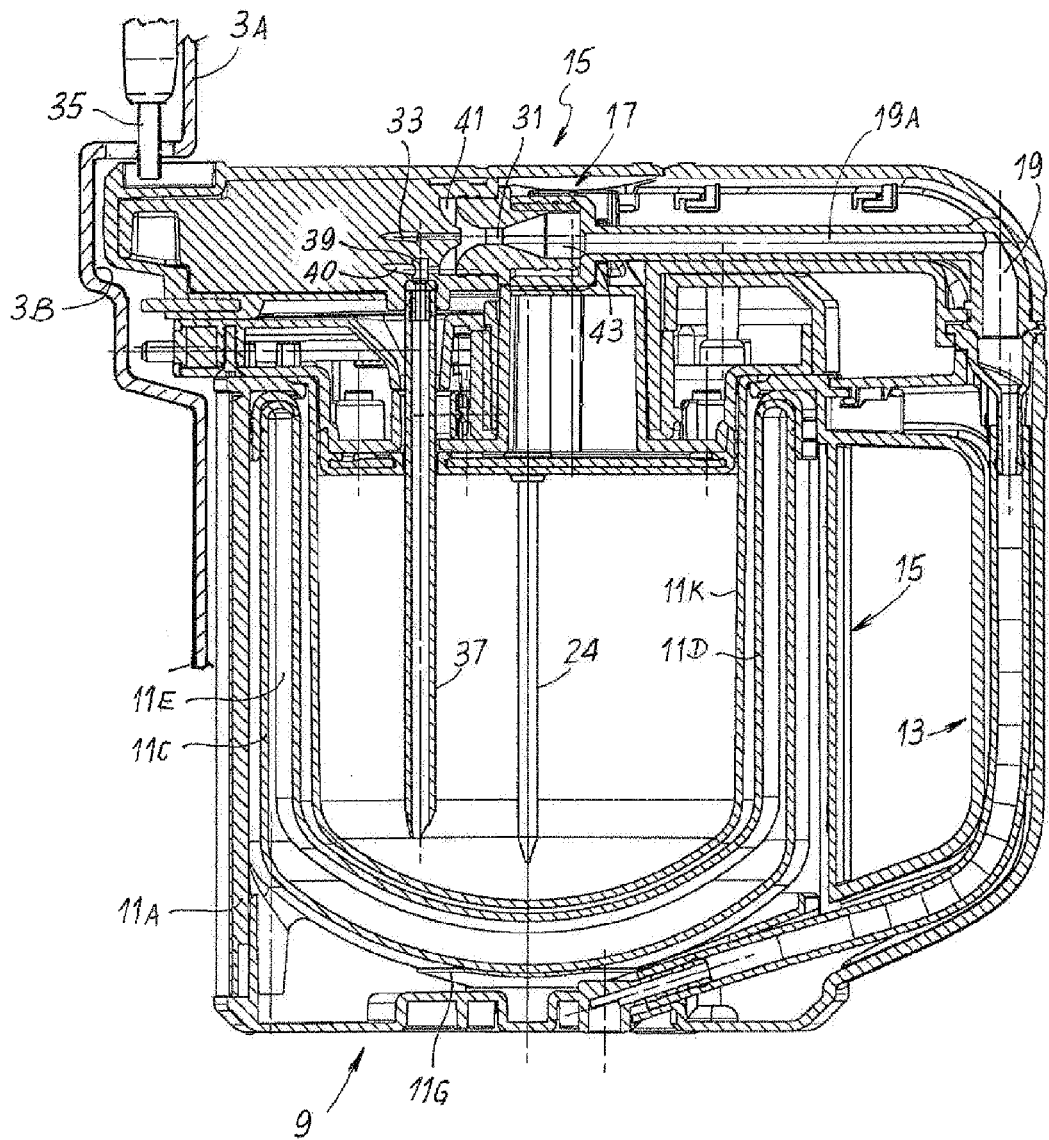
FIGS. 2 and 3 are two sectional views along two vertical orthogonal planes of a container according to the invention.

The container 9 comprises a thermally insulated body 11 equipped with a handle 13 and a cover 15. An emulsifying module 17 is connected to the cover 15 and may be of a known type. FIG. 2 shows, in an exemplary and schematical manner, a particular emulsifying module of which the main components will be illustrated below. The emulsifying module 17 is in fluid connection with a nozzle 19 supplying hot or emulsified milk to the mug beneath. The milk supply nozzle 19 may be of any shape. As shown in the embodiment illustrated, said nozzle can preferably be oriented from a non-working position, shown in FIG. 1, into a position rotated through approximately 90° and in which it is arranged above the cup positioned beneath the coffee supply module 5, in such a way that the coffee supplied from the supply module 5 and the milk supplied from the milk supply nozzle 19 can be collected simultaneously in this cup.

A thermometer 20 that has a temperature indicator 21, visible from the outside and connected to a heat sensor arranged inside the container 9 in the vicinity of the base thereof, is disposed inside the container 9 in a thermally insulated manner. In one embodiment the indicator 21 and the relative heat sensor, described below with reference to FIGS. 2 and 3, are carried by the cover 15 in such a way that they can be separated from the body 11 of the container 9, for example for washing.

Firstly, with an arrangement of this type it is possible to keep the milk at a low temperature, owing to the insulation of the container 9, for a longer period of time than that allowed by normal containers that are not insulated. In addition, thanks to the possibility of reading the temperature by the indicator 21, it is possible to check the temperature of the milk contained in the container 9 and to get ready to replace the container 9 in the fridge when this temperature exceeds a predetermined value, for example 7-8° C., so as to preserve the milk and stop it from going off.

Figure 3:
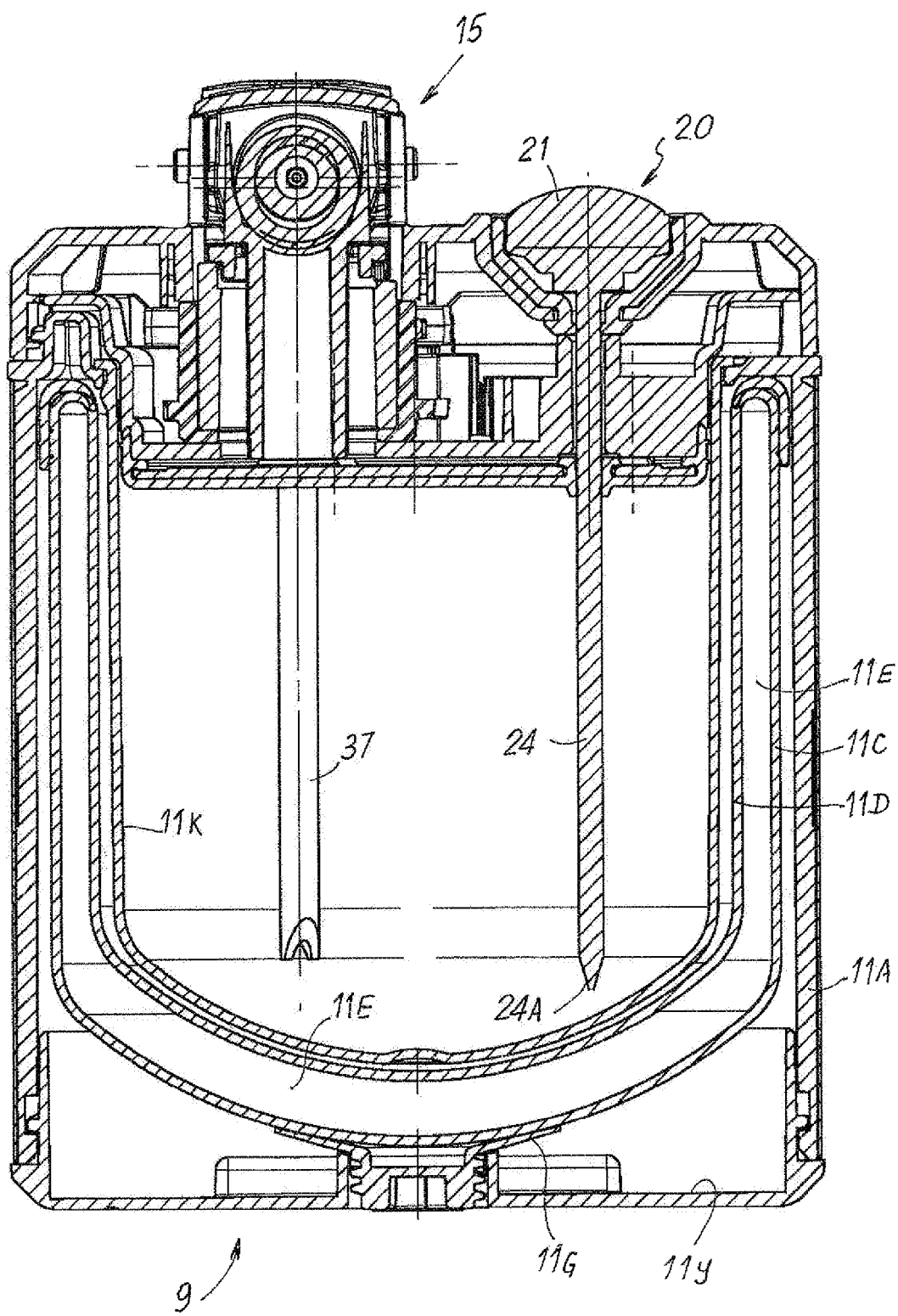

FIGS. 2 and 3 show two longitudinal sections of the container 9. In particular, the main members of the emulsifying module 17 can be seen in FIG. 2. It comprises a body in which a Venturi tube 31 that is coaxial with a nozzle 33 for injecting steam produced by the boiler (not shown) of the machine 1 is formed. The steam is fed to the emulsifying module 17 by the steam supply nozzle 35 carried by the front door 3A of the machine 1. The steam injected into the Venturi tube 31 causes the milk to be sucked up from the container 9 through a milk suction pipe 37 extending from the cover 15 of the container 9 toward the base thereof. In some embodiments the suction pipe 37 leads into a pre-chamber 39 connected to a suction chamber 41 arranged in front of the inlet of the Venturi tube 31. A pipe for supplying air that can be sucked up through a nozzle beside the steam supply nozzle 35, or else through a reamed hole formed in the emulsifier 17 leads into the pre-chamber 39. An inlet opening 40 for admitting air to the pre-chamber 39 is shown schematically in the drawing. The milk is emulsified with air in the pre-chamber 39 at low temperature. The emulsified milk is then heated by being contacted with the steam. Heating of the milk and condensation of the steam are completed in the mixing chamber 43 at the outlet of the Venturi tube 31. The hot milk is then supplied through a pipe 19A toward the milk supply nozzle 19.

When it is required for hot milk that has not been emulsified to be supplied, the air suction opening is closed in a manner known per se.

In FIG. 2 the milk supply nozzle 19 is arranged in a position for non-use, i.e. for washing, above the handle 13 of the container 9. As indicated above, a pipe 14 for discharging the condensate and/or hot water for washing supplied through the emulsifier 17 in the washing phases of the device extends inside the handle 13. The discharge pipe 14 ends at a discharge opening 51 beside the base of the container 9.

The thermometer 20 for checking the temperature of the milk contained in the container 9 can also be seen in FIGS. 2 and 3. In addition to the indicator 21 visible on the upper part of the cover 15 of the container 9, the thermometer 20 also comprises a shank 24 extending toward the base of the container 9 and carrying a heat sensor at its end 24A.

Figure 4:
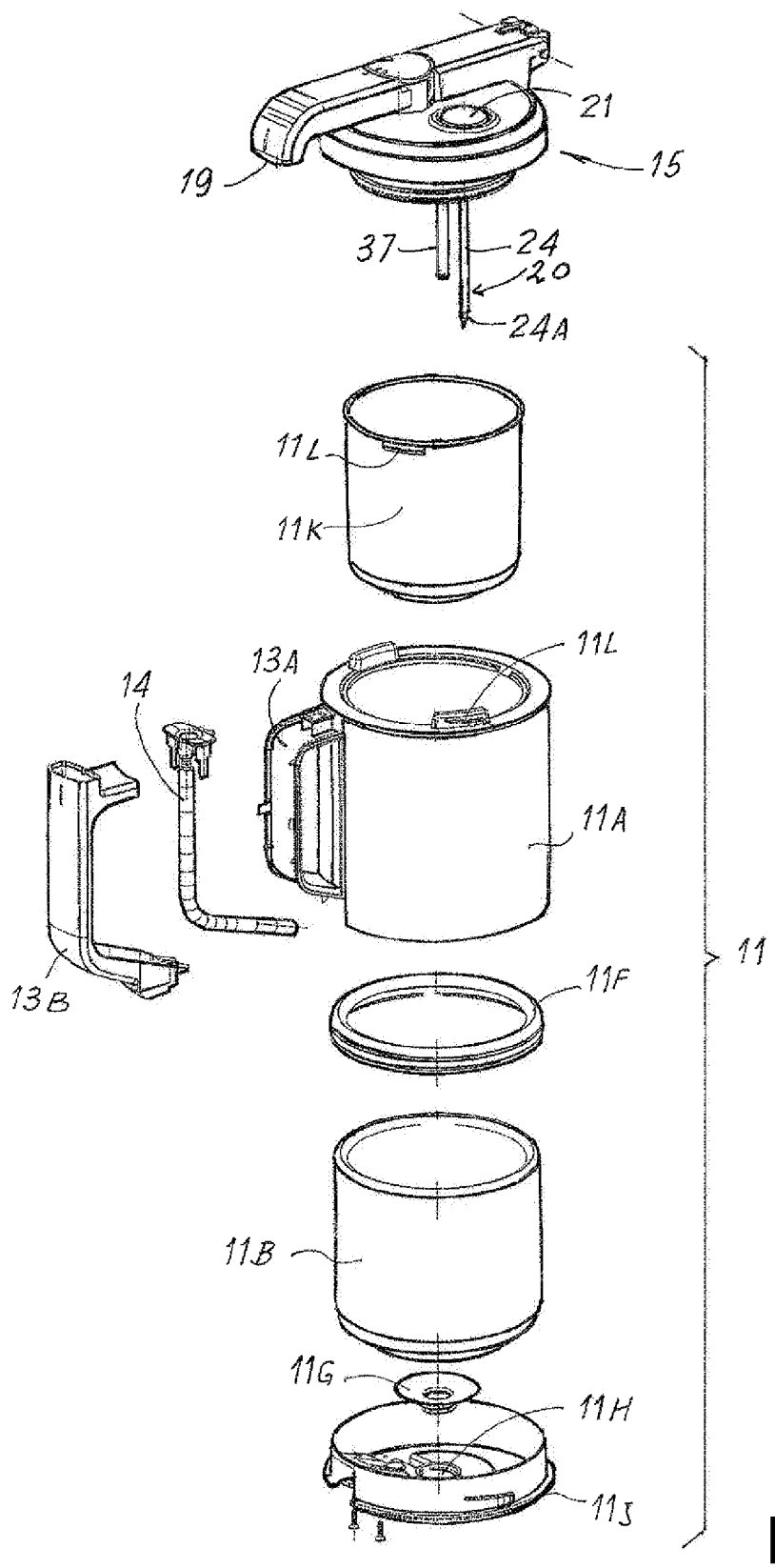
FIG. 4 is an exploded view of the thermally insulated container.

The construction of the container 9 and its various components is shown, in particular, in the exploded view of FIG. 4. The body 11 is formed by a housing 11A formed by a substantially cylindrical sleeve, inside which a thermally insulating member 11B formed by two walls 11C, 11D is inserted.

A chamber 11E under vacuum is formed between said walls 11C, 11D. The walls 11C, 11D may be made, for example, of glass or another suitable material. The thermally insulating member is fixed in the cylindrical housing 11A by an upper centring collar 11F and by a plate 11G that presses against the base of the thermally insulating member 11B under the force of a compression spring 11H arranged between the plate 11G and a base member 11J. The base member 11J can be coupled in a stable manner, for example by adhesion or welding, to the cylindrical housing 11A. Preferably however, the coupling between the members 11J and 11A is reversible and may be achieved, for example, in the form of a screwed or bayonet coupling. The contact points and therefore the points at which thermal exchange may occur by conduction between outer wall of the body 11 of the container 9 (formed by the housing 11A and by the base member 11J) and the thermally insulating member 11B are thus reduced.

A bowl 11K is inserted into the thermally insulating member 11B, which forms a cavity that is open at the top and surrounded by the chamber under vacuum 11E, which bowl forms the inner surface of the container 9 and is shaped so as to correspond substantially to the shape of the cavity surrounded by the chamber under vacuum 11E. The bowl 11K defines the holding volume of the milk and is coupled to the cylindrical housing 11A by a coupling 11L that may be a mortise coupling with an undercut, a bayonet coupling or another reversible connection.

In the example shown the cylindrical housing 11A is formed integrally with a first portion 13A of the handle 13, the second portion of which is formed by a member 13B that can be snapped-in and coupled to the portion 13A, by adhesion or by welding, so as to form an empty space between the two portions 13A, 13B in which the discharge pipe 14 is housed.

The construction of the container 9 described above makes it possible to easily disassemble the bowl 11K from the rest of the container for cleaning, even in dishwashers. If the base member 11J is fixed reversibly to the housing 11A, it can be removed so as to make it possible to clean even the internal parts of the container 9 and, if necessary, to replace damaged parts, in particular the thermally insulating member 11B.

It is understood that the drawings merely show an example given only as a practical demonstration of the invention, which can be varied in form and arrangement without departing from the scope of the concept on which the invention is based. The optional inclusion of reference numerals in the accompanying claims is aimed at facilitating reading of the claims with reference to the description and the drawings, and does not limit the scope of protection represented by the claims.

The invention claimed is:

1. A container comprising:
   an emulsifying device having a milk suction pipe;
   a nozzle configured to supply at least one of hot and emulsified milk with a discharge end outside the container;
   a steam inlet;
   an air inlet; and
   a handle,
   wherein the container is thermally insulated and configured to minimize a thermal exchange by conduction,
   wherein the nozzle is rotatable via a rotation between at least two positions including a milk supply position and a washing position,
   wherein the handle includes a discharge pipe formed in the handle, the discharge pipe having a bottom and being open at the bottom, and wherein in the washing position, the nozzle is aligned with an upper inlet end of the discharge pipe opposite the bottom.

2. The container of claim 1, further comprising a thermometer configured to measure a temperature of milk contained in said container.

3. The container of claim 2, further comprising a closure cover, wherein said emulsifying device is carried by the closure cover of the container.

4. The container of claim 3, wherein said thermometer is carried by said closure cover.

5. The container of claim 3, wherein the nozzle is rotatable around a pivot axis parallel to a longitudinal axis of the container between the at least two positions, the nozzle being rotatable about a pivot point located on the closure cover.

6. The container of claim 5, wherein the nozzle is rotatable 90° around the pivot axis between the at least two positions.

7. The container of claim 1, wherein in said milk supply position the nozzle is unaligned with the upper inlet end of said discharge pipe opposite the bottom.

8. The container of claim 1, further comprising an outer housing, a bowl defining an inner surface of the container, and a thermally insulating member arranged inside the outer housing, wherein the thermally insulating member forms a cavity, and wherein the bowl is insertable in the cavity, said bowl being removable.

9. The container of claim 8, wherein the thermally insulating member is formed by two walls separated by a chamber under vacuum for minimizing the thermal exchange between the outer housing and the thermally insulating member.

10. The container of claim 1, wherein the nozzle and the discharge pipe are configured to be removably associated at the upper inlet end of the discharge pipe formed in the handle via the rotation between the at least two positions.

11. A coffee machine comprising:
a coffee supply unit;
a steam supply nozzle; and a
container connectable to said steam supply nozzle,
wherein the container comprises:
an emulsifying device having a milk suction pipe;
a nozzle configured to supply at least one of hot and emulsified milk with a discharge end outside the container;
a steam inlet configured to receive steam from the steam supply nozzle; and
an air inlet,
wherein the container is thermally insulated and configured to minimize a thermal exchange by conduction,
wherein the nozzle is rotatable via a rotation between at least two positions including a milk supply position and a washing position,
wherein the container further comprises a handle and a discharge pipe formed in said handle, the discharge pipe having a bottom and being open at the bottom, and
wherein in the washing position, the nozzle is aligned with an upper inlet end of the discharge pipe opposite the bottom.

12. The coffee machine of claim 11, wherein the nozzle is rotatable around an axis parallel to a longitudinal axis of the container between the at least two positions, nozzle being rotatable about a pivot point located external to the coffee machine and the coffee supply unit.

13. The coffee machine of claim 12, wherein the nozzle is rotatable 90° around the pivot point between the at least two positions.

14. The coffee machine of claim 12, wherein the pivot point is located on a cover of the container.

15. A container comprising:
an emulsifying device having a milk suction pipe;
a nozzle configured to supply at least one of hot and emulsified milk with a discharge end outside the container;
a steam inlet;
an air inlet;
a handle; and
a discharge pipe that is open at a bottom end of the discharge pipe forming a discharge opening near a base of the container for a discharge near the base of the container,
wherein the container is thermally insulated,
wherein the nozzle is moveable between at least two positions, including a milk supply position and a washing position,
wherein the discharge pipe is formed in the handle,
wherein in the washing position the nozzle is aligned with an upper inlet end of the discharge pipe formed in the handle, the upper inlet being opposite the bottom end, and
wherein in the milk supply position the nozzle is unaligned with the upper inlet end of the discharge pipe formed in the handle, the upper inlet being opposite the bottom end.

16. The container of claim 15, wherein the nozzle is moveable around an axis parallel to a longitudinal axis of the container between the at least two positions.

17. The container of claim 15, further comprising a cover configured to cover an open end of the container and to carry the emulsifying device and the nozzle.

18. The container of claim 17, wherein the cover is located in a cover plane when covering the container, wherein the nozzle is moveable between the at least two positions in a plane parallel to the cover plane, and wherein the nozzle is moveable about a pivot point located on the cover.

* * * * *